(12) United States Patent
Smith

(10) Patent No.: US 8,950,534 B2
(45) Date of Patent: Feb. 10, 2015

(54) DIRECTED AIR SYSTEMS FOR IMPROVING AERODYNAMICS OF A VEHICLE

(75) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/309,379

(22) Filed: Dec. 1, 2011

(65) Prior Publication Data

US 2013/0140103 A1    Jun. 6, 2013

(51) Int. Cl.
*B60H 1/00* (2006.01)
*B60H 3/00* (2006.01)

(52) U.S. Cl.
USPC ........ 180/68.2; 180/309; 180/68.1; 180/68.3; 180/68.4

(58) Field of Classification Search
CPC ........ B60H 1/00; B60H 3/00; B60H 2001/00; B60H 2003/00; B60R 99/00
USPC ................... 180/309, 68.1, 68.2, 68.4
See application file for complete search history.

(56) References Cited

U.S. PATENT DOCUMENTS

| 3,972,494 | A | 8/1976 | Drews |
| 4,180,290 | A | 12/1979 | Drews |
| 4,460,055 | A | 7/1984 | Steiner |
| 4,673,206 | A | 6/1987 | Kretschmer |
| 5,374,013 | A | 12/1994 | Bassett |
| 5,908,217 | A | 6/1999 | Englar |
| 6,068,328 | A | 5/2000 | Gazdzinski |
| 6,793,177 | B2 | 9/2004 | Bonutti |
| 7,121,368 | B2 * | 10/2006 | MacKelvie ................. 180/68.1 |
| 7,216,923 | B2 * | 5/2007 | Wong et al. ............... 296/180.2 |
| 7,237,827 | B2 | 7/2007 | Shahbazi |
| 7,510,149 | B2 | 3/2009 | Miller et al. |
| 2002/0157884 | A1 * | 10/2002 | Jain et al. ..................... 180/68.1 |
| 2006/0103167 | A1 | 5/2006 | Wong |
| 2008/0150321 | A1 | 6/2008 | Neale |
| 2009/0140543 | A1 | 6/2009 | Caldirola |
| 2010/0007172 | A1 | 1/2010 | Zhu |
| 2010/0106380 | A1 * | 4/2010 | Salari et al. ..................... 701/49 |

FOREIGN PATENT DOCUMENTS

EP    0 420 826 B1    6/1994

OTHER PUBLICATIONS

International Search Report and Written Opinion mailed Mar. 15, 2013, issued in corresponding International Application No. PCT/US2012/067377, filed Nov. 30, 2012, 9 pages.

(Continued)

*Primary Examiner* — Hau Phan
*Assistant Examiner* — Bryan Evans
(74) *Attorney, Agent, or Firm* — Christensen O'Connor Johnson Kindness PLLC

(57) ABSTRACT

Systems and methods are disclosed for improving the aerodynamic efficiency (e.g., reduce drag) on vehicles, such as class 8 tractors. In some disclosed examples, the systems and methods utilize exhausted gases from an internal combustion engine of the vehicle to direct a stream of gas forwardly of the vehicle. In other disclosed examples, the systems and methods utilize generated air flow from, for example, electric fans, engine driven or pneumatically/hydraulically driven pumps, etc., to direct a stream of gas forwardly of the vehicle for reducing the aerodynamic drag on vehicles. In yet other disclosed examples, the systems and methods utilize a unique configuration of the vehicle's radiator fan(s) in order to direct a stream of gas forwardly of the vehicle.

17 Claims, 6 Drawing Sheets

(56) References Cited

OTHER PUBLICATIONS

"Coanda Soliton Effect," montalk.net, Jul. 20, 2004, <http://montal.net/science/71/coanda-soliton-effect> [retrieved Oct. 18, 2010], 5 pages.

"Exhaust," Formula 1 Dictionary, <http://f1-dictionary.110mb.com/exhoust.html> [retrieved Oct. 18, 2010], 6 pages.

"Super Cavitation Technology Applied to Cars?" Yahoo!7 Answers, <http://au.answers.yahoo.com/question/index?qid=20100403055156AA6yNpg> [retrieved Oct. 18, 2010], 3 pages.

"Super Cavitation Weapons: Surface, Undersea, and Low to Intermediate Atmospheric Theaters," The Black Hole -//- Universal Community > Technology & Science > Mad Science, <http://blackhole.xcerces.com/showthread.php?t/=7118> [retrieved Oct. 18, 2010], 6 pages.

\* cited by examiner

DIRECTED AIR SYSTEMS FOR IMPROVING AERODYNAMICS OF A VEHICLE

BACKGROUND

Numerous means have been sought to improve the fuel-efficiency of moving bodies, and especially moving bluff bodies, by reducing their aerodynamic drag. In the field of surface transportation, and particularly in the long-haul freight industry, even small improvements in fuel efficiency can reduce annual operating costs significantly. It is therefore advantageous in the design of a vehicle to reduce drag forces; thereby increasing the aerodynamic properties and efficiency of the vehicle.

The over-the-highway cargo hauling tractor-trailer combination is one vehicle that experiences excessive aerodynamic drag. Generally described, tractor-trailer combinations typically include a tractor having a so-called fifth wheel by which a box-like semi-trailer may be attached to the tractor by an articulated connection for transportation of the semi-trailer. The front profile of a conventional tractor is typically a bluff body, producing significant pressure drag at typical highway speeds. One reason for the large pressure drag is the presence of a sharp angle located at a leading edge of the tractor hood. More specifically, typical tractor front sections include a substantially vertical front surface or grill that meets, along an upper edge, a substantially horizontal top surface. The air flow passing over the front section, therefore, must negotiate an abrupt change in direction as the edge where the hood structure transitions from a substantially vertical orientation to a substantially horizontal orientation. This abrupt turn causes the flow to 'separate' from the top surface of the hood, forming a highly turbulent region of air located directly above the top surface of the hood, between the leading edge and the windshield.

Referring to FIG. 1, a perspective view of a prior art Class 8 tractor 10 showing an air stream 12 flowing over a hood 16 is depicted. The depicted air stream 12 encounters the conventionally shaped Class 8 tractor 10 at the substantially vertical surface of the front surface or grill 14 of the hood 16. (It will be appreciated that for purposes of the present aerodynamic discussion, the tractor's 10 forward motion at highway speeds is equivalent to an air stream 12 having a similar but opposite velocity flowing over a stationary tractor.) The air stream 12 turns upwardly as it negotiates the grill 14, and separates at a leading edge 15 of the hood 16, thereby forming a vortex or wake region 22 located aft of the leading edge 15. The airflow separation at the leading edge 15 causes the formation of a large wake region 22 and pressure losses due to eddy formation in the wake region, thereby increasing drag on the vehicle.

Previous investigations for reducing aerodynamic drag of tractor-trailer combinations, including reducing the bluff body characteristics of the conventional Class 8 tractor 10, resulted in streamlining the outer contours of the front section of the tractor 10, widespread adoption of fixed air deflectors mounted on the roofs of tractor cabs, and wholly redesigned tractors that utilize aerodynamic fairings to gradually increase the relatively small frontal area of the tractors to match, and to blend smoothly with, the larger cross-section of typical trailers. For example, in order to reduce abrupt changes in air flow over the hood, some modern tractor hoods have been made to slope downwardly from the windshield toward the front of the tractor, creating a less abrupt transition between the front grill 14 of the front section and the top surface of the hood 16. This more aerodynamic shape reduces the amount of flow separation, and consequently reduces the pressure drag exhibited upon the vehicle. However, such a design may still incorporate discontinuous regions, due to packaging for under hood components such as radiators, air ducting, or coolant tanks, that produce abrupt changes in air flow resulting in the creation of a wake region 22, again an increase in drag.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a vehicle is provided, comprising a front section and a directed gas generation unit. The directed gas generation unit is capable of generating a quantity of pressurized gas and directing the quantity of pressurized gas forwardly of the front section and outwardly of the vehicle.

In accordance with another aspect of the present disclosure, a method is provided for reducing drag on a vehicle. In one embodiment, the vehicle includes a front section. The method includes generating a pressurized stream of gas and directing the pressurized stream of gas forwardly of the front section of the.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
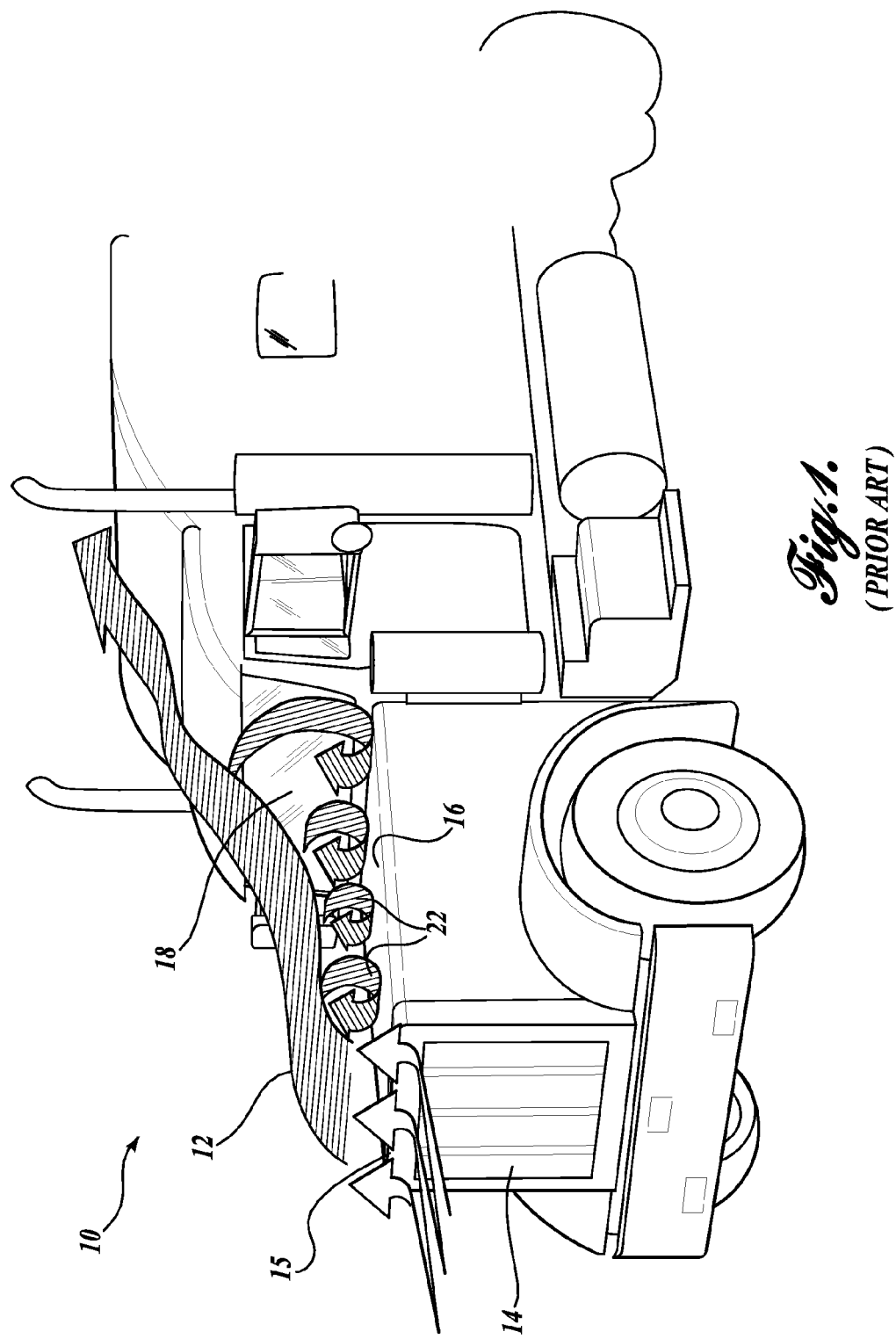
FIG. 1 is a front perspective view of a conventional tractor showing the flow path of an air stream over the front section thereof during movement of the vehicle.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of systems and methods for improving the aerodynamic efficiency (e.g., reduce drag) on vehicles, such as class 8 tractors and tractor-trailer combinations. Some embodiments are directed to systems and methods that utilize exhausted gases from an internal combustion engine (e.g., piston engine, rotary engine, turbine engine, etc.) of the vehicle for reducing the aerodynamic drag thereon. In other embodiments, the systems and methods utilize generated air flow from, for example, electric fans, engine driven or pneumatically/hydraulically driven pumps, etc., for reducing the aerodynamic drag on vehicles. In yet other embodiments, the systems and methods utilize a unique configuration of the vehicle's radiator fan(s) for reducing the aerodynamic drag thereon.

Although embodiments of the present disclosure will be described with reference to a Class 8 tractor and/or tractor-trailer combination, including traditional as well as cab over engine configurations, one skilled in the relevant art will appreciate that the disclosed embodiments are illustrative in nature, and therefore, should not be construed as limited to such applications. It should therefore be apparent that the methods and systems of the present disclosure have wide application, and may be used in any situation where a reduction in the drag forces on a bluff body is desirable, including but not limited to passenger vehicles, light and medium duty vehicles, buses, RV's, trains, vessels, etc. It should be noted that for purposes of this disclosure, terminology such as "upper," "lower," "vertical," "horizontal," "fore," "aft," "inner," "outer," "front," "rear," etc., should be construed as descriptive and not limiting.

Prior to discussing the details of various aspects of the present disclosure, it should be understood that one or more sections of the following description may be presented in terms of logic and operations that may be performed by conventional electronic components. These electronic components, which may be grouped in a single location or distributed over a wide area, generally include controllers, microcontrollers, control units, processors, microprocessors, etc. It will be appreciated by one skilled in the art that any logic described herein may be implemented in a variety of configurations, including but not limited to hardware, software, and combinations thereof. In circumstances were the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. Accordingly, the following descriptions and illustrations herein should be considered illustrative in nature, and not limiting the scope of the present disclosure, as claimed.

Figure 2:
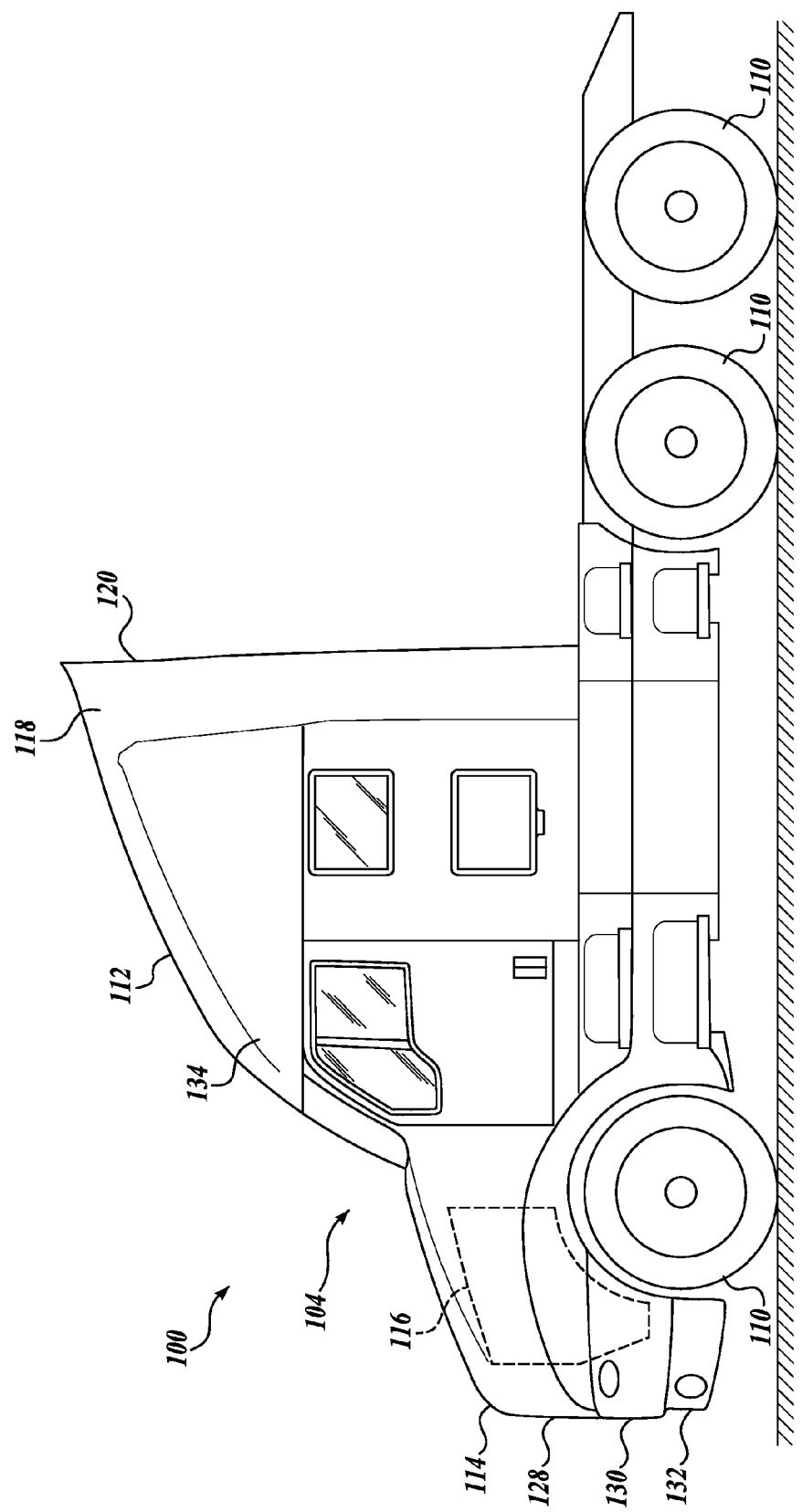
FIG. 2 is a side elevational view of a tractor incorporating a drag reduction system formed in accordance with aspects of the present disclosure.

FIG. 2 illustrates a one example of a vehicle, such as tractor 100, incorporating one embodiment of a drag reduction system 140 (See FIG. 4) formed in accordance with aspects of the present disclosure. During use, the drag reduction system directs pressurized gases to selected regions of the tractor 100 for reducing the aerodynamic drag thereon. The drag reduction system 140 or any combination of components hereinafter described may be installed on new tractor or may be retrofitted on an existing tractor. Further, as will be described in detail below, the drag reduction system 140 may be controlled to selectively determine when and/or at what flow rates the pressurized gases are directed to the selected regions of the tractor.

As best shown in FIG. 2, the tractor 100 comprises a chassis that is supported by wheels 110 connected thereto via conventional suspension assemblies (not shown). A conventional cab assembly 112 is supportably mounted on the chassis. The cab assembly 112 includes a front end 114 that generally houses an internal combustion engine 116 that propels the combination and a rear end 118 that defines a generally vertically oriented rear surface 120.

As is typical of highway tractors, the cab assembly 112 may include a cab, sleeper box and various roof fairings, cab or sleeper box extenders, and side trim tabs, if desired, but not required to appreciate the benefits of the present disclosure. Collectively, however, these structures are referred to herein as the cab assembly or cab 112. It will be understood, however, that a myriad of possible combinations and cab shapes can comprise the cab assembly. As is known in the art, the tractor 100 may include fairings or cowls mounting to the front end 114 for improving the aerodynamics of the tractor 100, if desired. As will be described in more detail below, the front end 114, in several embodiments, may further include portions of the drag reduction system 140 suitable for directing pressurized gases forwardly of the tractor grille 128.

Figure 3:
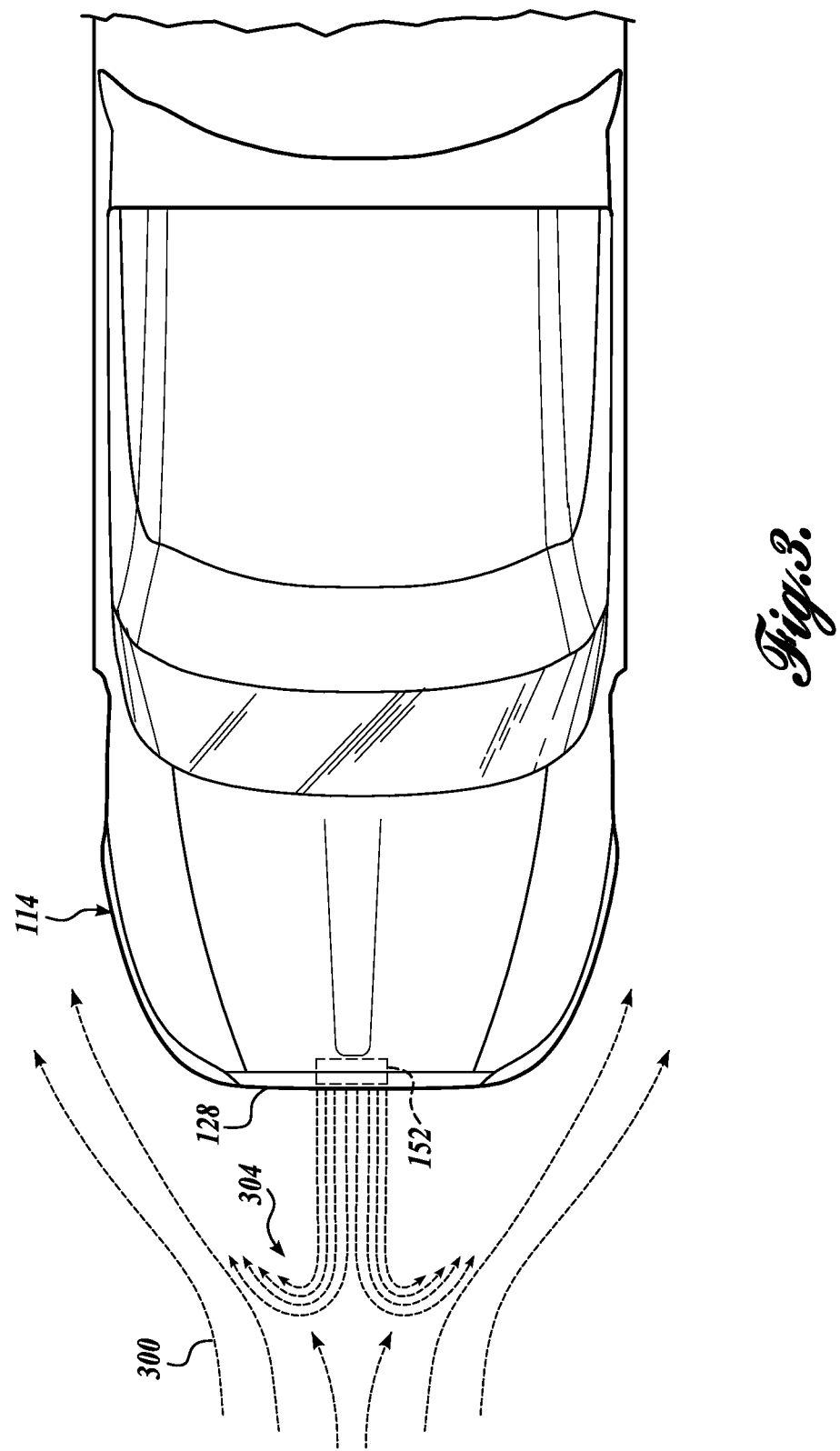
FIG. 3 is a partial top view of the tractor of FIG. 2 showing the flow path of an air stream over the front section thereof during movement of the vehicle.
Figure 5:
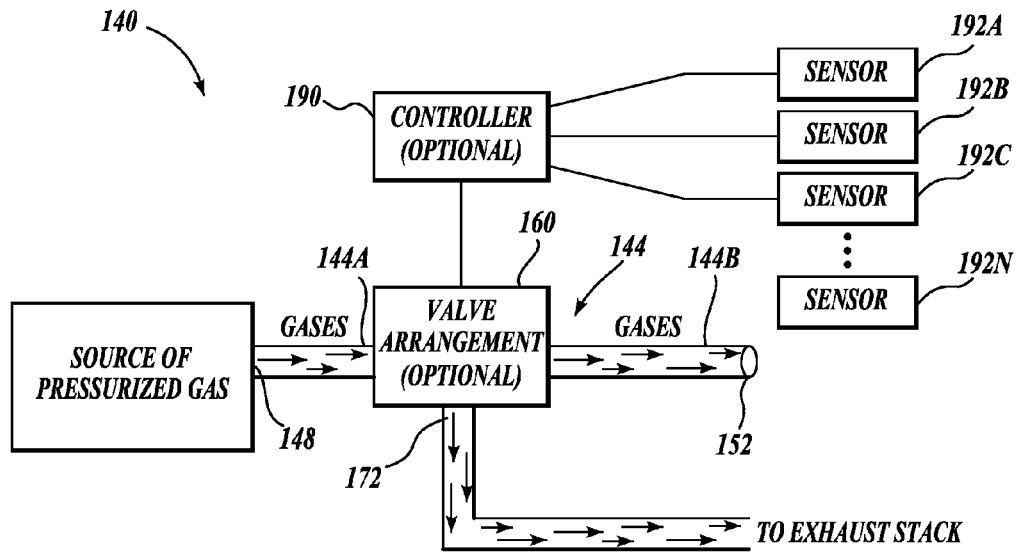
FIG. 5 is a schematic diagram of one embodiment of the drag reduction system formed in accordance with aspects of the present disclosure.

FIG. 5 is a schematic diagram of one embodiment of the drag reduction system 140 suitable for incorporation into the tractor 100 (see FIG. 2) and capable of introducing pressurized exhaust gases to selected regions of the tractor, for example, forwardly of the tractor grille 128, the bumper 130, the forward fairing 132, etc. The system 140 includes tractor piping structure 144 defining an inlet port 148 and at least one outlet or discharge port 152. In one embodiment, the discharge port 152 may be positioned behind the grille 128 approximately along the vehicle's longitudinal axis, as best shown in FIGS. 2 and 3. Preferably, the discharge port 152 directs air forwardly of the tractor grille 128 in a direction generally parallel with the longitudinal axis of the tractor, although other angles of introduction are contemplated to be within the scope of the present disclosure, including but not limited to angles plus or minus 45 degrees from the longitudinal axis of the tractor.

Figure 6A:
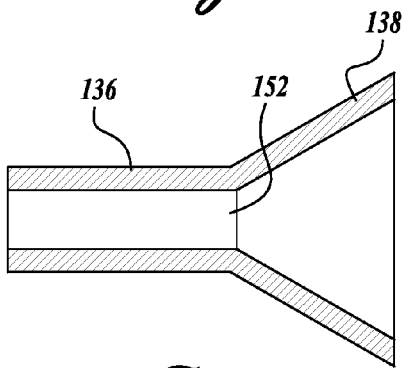
FIGS. 6A and 6B are schematic representations of top and side views of one example duct forming the outlet port of the drag reduction system of FIG. 4.
Figure 6B:
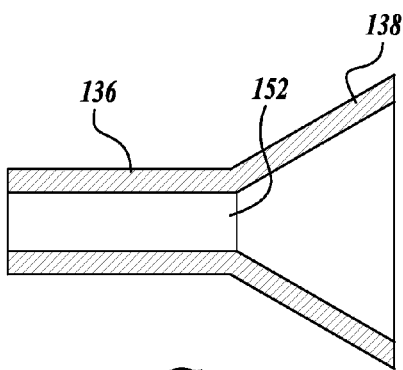

In other embodiments, the discharge port 152 may be positioned along the bumper 130, the forward bottom fairing 132, or the forward top fairing 134. In these embodiments, the discharge port 152 can be mounted to or integrated into the aforementioned components of the tractor 100 in such as manner so as to direct the pressurized air in a forwardly direction. In several embodiments, the discharge port 152 may be formed by a biaxial duct 136, as best shown in the top and side cross sectional views of FIGS. 6A and 6B. In one embodiment, the biaxial duct 136 is in the shape of a horn, having a flared bell mouth 138 from which exits the directed air.

Returning to FIG. 5, the inlet port 148 is connected in fluid communication to a source of pressurized gas, for example, the tractor engine 116 as shown schematically in FIG. 2. Alternatively, the source of pressurized gas can be an electric air pump, an engine driven air pump, a hydraulically/pneumatically driven air pump, etc. While one discharge port 152 is shown in the embodiment of FIGS. 2 and 3, it will be appreciated that the tractor piping structure 144 may include a distribution manifold or plenum and other optional components for forming a plurality of spaced apart discharge ports (not shown).

In one embodiment, the system 140 may include a valve arrangement 160 operably connected in-between the inlet and discharge ports 148 and 152 of the tractor piping structure 144, if desired, for selectively determining the timing and/or quantity of pressurized gas routed to the at least one discharge port 152. As such, the valve arrangement divides the tractor piping structure 144 into first and second piping structure segments 144A and 144B. The valve arrangement 160 may include one or more valves, such as solenoid valves, needle valves, etc., and associated components. The valve arrangement 160 can be manually controlled to determine the flow rate of gas introduction, or may be electrically controlled, as will be described in more detail below. Other configurations of the system 140 are contemplated to be within the scope of the present disclosure. For example, the system 140 may include piping structure 144 but omit the valve arrangement 160. As such, in this embodiment, the discharge port 152 will receive an unrestricted flow of pressurized gas as long as the engine 116 or other source of pressurized gas is operating.

As was described above, the inlet port 148 in one embodiment is connected in fluid communication with the internal combustion engine 116 of the tractor 104. In this and other embodiments, the inlet port 148 of the tractor piping structure 144 may be connected to the exhaust manifold, exhaust piping, or exhaust passageway of the engine 116 in any manner known in the art so that exhausted gases generated by the engine 116 are supplied to the discharge port 152 through the tractor piping structure 144. Alternatively, the tractor piping structure 144 may include structure, such as an exhaust manifold, etc., so that the tractor piping structure 144 can connect directly to the engine 116 for receiving gas therefrom. In one embodiment of the present disclosure, the valve arrangement 160 may be configured and controlled such that gas exhausted from the engine 116 partially or fully by-passes the discharge port 152 and is vented to atmosphere, for example, through a conventional exhaust pipe stack or other exhaust piping structure (not shown).

Figure 4:
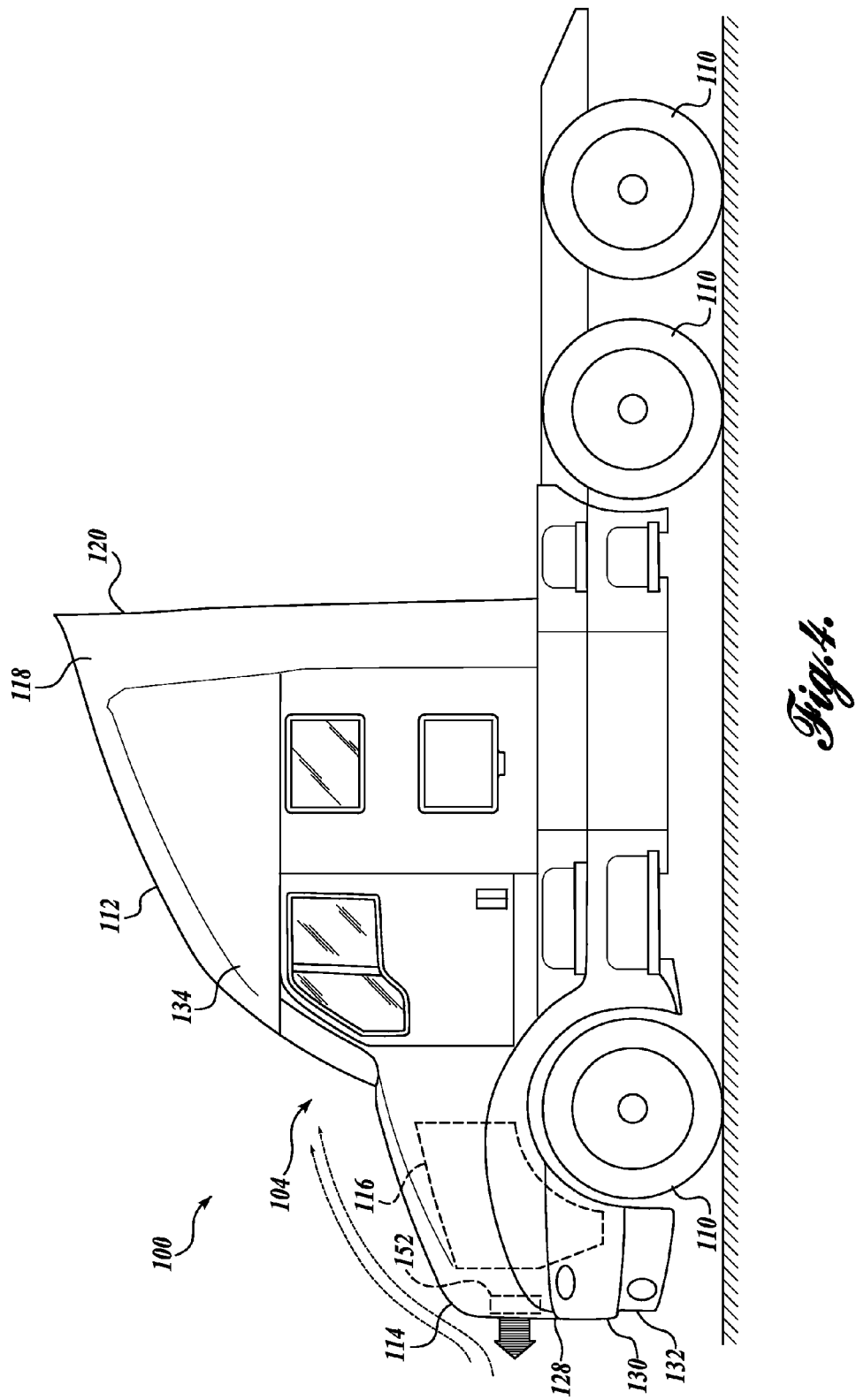
FIG. 4 is a side elevational view of a tractor 2 showing the flow path of an air stream over the front section thereof during movement of the vehicle.

As was described above, the valve arrangement 160 may be electrically controlled by an optional controller 190 shown schematically in FIG. 4. The controller 190 is connected in electrical communication with the valve arrangement 160 and other components, for example, one or more sensors 192A-N, as will be described in detail below. The controller 190 may include a logic system for determining the operation of the valve arrangement 160, which may be determined for each distinct application. It will be appreciated by one skilled in the art that the logic may be implemented in a variety of configurations, including but not limited to, hardware, software, and combinations thereof.

In one embodiment, the controller 190 may be a computing device that includes a processing unit, a memory, and input/output (I/O) circuitry connected in a conventional manner. The memory may include random access memory (RAM), read only memory (ROM), or any other type of digital data storage means. The I/O circuitry may include conventional buffers, drivers, relays and the like, for sending device appropriate signals to the valves of the valve arrangement 160.

The one or more sensors 192A-N are connected to the controller 190 each outputting a signal to the controller 190 indicative of an operating parameter of the tractor 100. For example, the sensors 192A-N may include but are not limited to an engine speed sensor for sensing engine speed, a throttle position sensor for sensing the position of the throttle valve (e.g., in spark-ignition engines), an accelerometer for sensing the acceleration of the vehicle, a wheel speed sensor for sensing the speed of the vehicle wheels, etc. The information from these sensors 192 and others may be utilized by the controller 190 to control the operation of the valve arrangement 160. For example, the controller 190 may operate the valve arrangement 160 to supply exhaust gas to the tractor discharge port 152 when, for example, the tractor 100 has reached a threshold speed (e.g., 10 mph) and/or when, for example, the tractor 100 is accelerating greater than a certain threshold amount. The controller 190 may also operate the valve arrangement 160 to terminate the supply of exhaust gas to the discharge port when, for example, the combination is idling. It will be appreciated that the controller 190 may comprise a separate processing unit dedicated to the valve arrangement 160. Alternatively, the functions carried out by the controller 190 may be carried out by an existing on-board processor, such as the engine control unit (ECU), or integrated or associated with another one or more controllers of the vehicle.

In another embodiment of the system 140, one of the sensors 192 may be a bake sensor for sensing the application of brakes. In this embodiment, the system 140 would discontinue or reduce the introduction of exhausted gases through discharge ports 152 when the brakes of the tractor 100 are applied so as to increase the amount of resistance (drag) against the forward motion of the tractor 100, thereby improving the braking ability of the tractor 100. It will be appreciated that other ways in which the system 140 may be controlled will readily be apparent to those skilled in the art and, accordingly, will not be described in any further detail.

Figure 7:
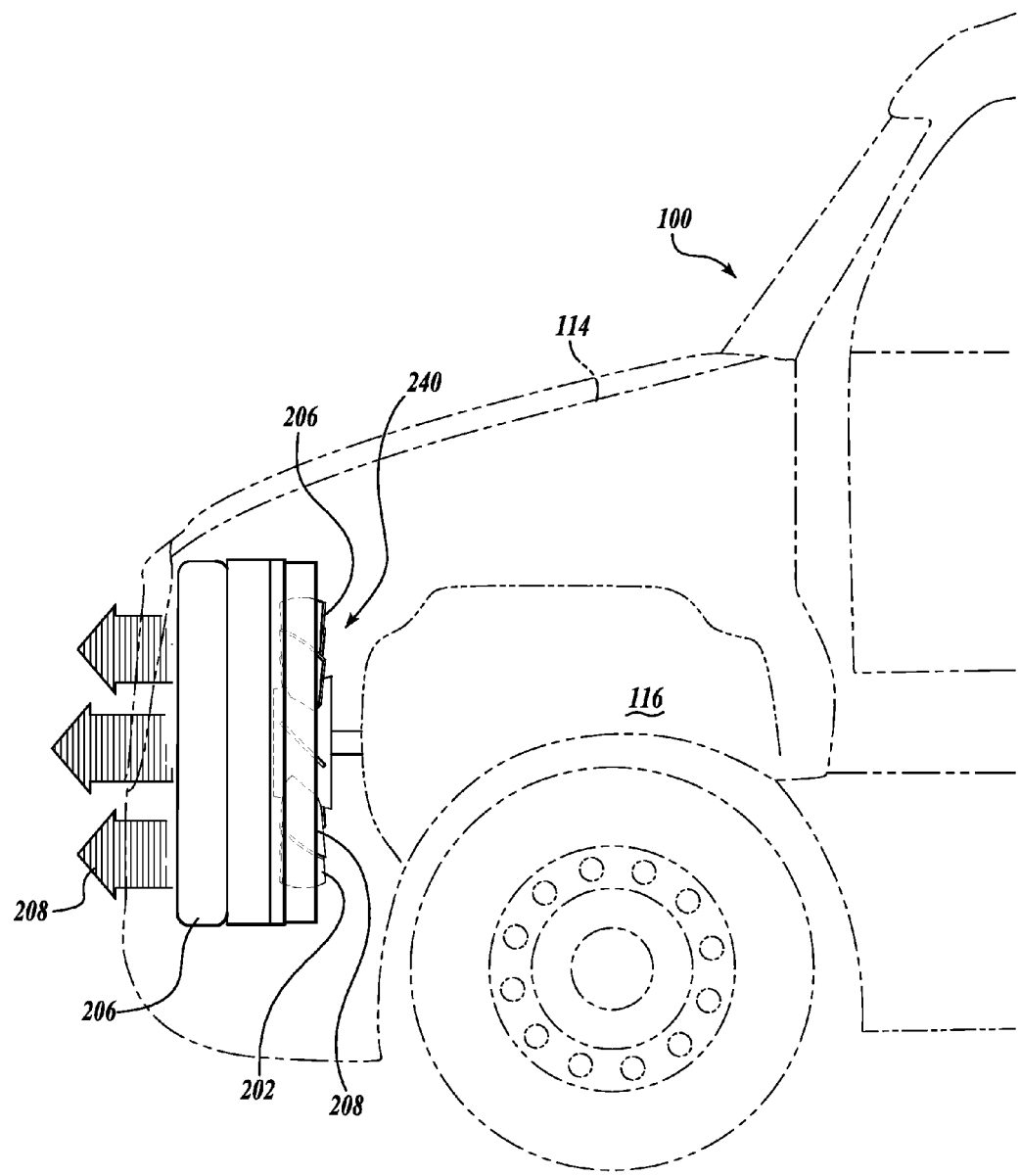
FIG. 7 is a side elevation view of a tractor incorporating another embodiment of the drag reduction system in accordance with aspects of the present disclosure.

FIG. 7 is another embodiment of a drag reduction system 240 formed in accordance with aspect of the present disclosure. As best shown in FIG. 7, one or more fans 202 of the cooling system can be used as the source of directed air for the system 240. In that regard, the fins 204 of the fan 202 are configured such that upon rotation by a mechanical source (e.g., the engine 116 as shown) or an electrical source (e.g., electric motor), a flow of air 208 is generated forwardly of the engine compartment, through the vehicle grille. While shown as located behind the radiator 206, the fan(s) can be mounted in front of the radiator 206. As well as improving aerodynamics, forward ejection of air from the engine fans provides a number of additional advantages. For example, the stagnating air in the engine compartment is better vented by the forward ejections of air and also allows for better flow though the cooling components.

The operational effects of the drag reduction systems described herein will now be described in detail with reference to FIGS. 2-7. To appreciate the benefits of the drag reduction systems of the present disclosure, the effects of an air stream on a conventional tractor (i.e., one that does not include the systems and methods of the present) will first be described. Turning now to FIG. 1, there is shown a conventional tractor. During operation, as the conventional tractor moves in a forward direction, the tractor combination, as was described above, encounters an air stream (not shown). It will be appreciated that for purposes of the present aerodynamic discussion, the tractor's forward motion at highway speeds is equivalent to an air stream having a similar but opposite velocity flowing over a stationary combination.

The depicted air stream 12 encounters the conventionally shaped Class 8 tractor 10 at the substantially vertical surface of the front surface or grill 14 of the hood 16. The air stream 12 turns upwardly as it negotiates the grill 14, and separates at a leading edge 15 of the hood 16, thereby forming a vortex or wake region 22 located aft of the leading edge 15. The airflow separation at the leading edge 15 causes the formation of a large wake region 22 and pressure losses due to eddy formation in the wake region, thereby increasing drag on the vehicle.

In contrast with the conventional tractor, and as shown best in FIGS. 3 and 4, when an air stream 300 encounters the tractor 100 incorporating the drag reduction systems described herein, a reduction in pressure drag is achieved for the following reasons. As the tractor 100 moves forward, pressurized gases, shown generally as arrows 304, are directed in the forward direction (against vehicle movement), or in some embodiments, forwardly of the front section 114 of the tractor 100. By directing gas forwardly of the vehicle (at the grille, cab fairings, bumper, etc.), a "soft" fairing or air shell is created forwardly of the vehicle body that affects the air stream 300 moving rearwardly. In particular, it has been shown in experiments that the "soft" fairing creates a stagnation region in front of the vehicle, and as a result, the vehicle body can benefit aerodynamically by its position in the low pressure wake (i.e., "drafting").

It will be appreciated that various components of the systems 140, 240 may be sold as a kit for installation on new vehicles built at the factory, for after-market shops that receive the combinations from the factory, or for retrofitting existing vehicles that desire the benefits of the systems and methods described herein. Additionally, it will be appreciated that the piping structure may be any light-weight flexible tubing or rigid or semi-rigid conduit known in the art or combinations thereof. Each piping structure may be one or multiple sections interconnected through components well know in the art.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A vehicle comprising:
a front section; and
a directed gas generation unit configured to generate a stream of pressurized gas and to selectively direct the stream of pressurized gas to a forwardly-facing discharge port and a vehicle venting component such that any portion of the stream of pressurized gas not directed to the forwardly-facing discharge port is directed to the vehicle venting component for venting to atmosphere, wherein the forwardly-facing discharge port faces forwardly of the front section, outwardly of the vehicle, and substantially parallel to the longitudinal axis of the vehicle;
wherein the directed gas generation unit is further configured to:
direct the stream of pressurized gas out of the forwardly-facing discharge port as the vehicle is moving forwardly in response to a speed or acceleration of the vehicle being greater than a threshold, wherein the threshold is one of a preselected vehicle speed and a preselected vehicle acceleration, and
discontinue the stream of pressurized gas out of the forwardly-facing discharge port in response to the speed or acceleration of the vehicle being less than the threshold.

2. The vehicle of claim 1, wherein the forwardly-facing discharge port includes a duct having a flared bell mouth.

3. The vehicle of claim 1, wherein the directed gas generation unit includes:
a source of pressurized gas; and
piping structure defining an inlet and the forwardly-facing discharge port, the inlet being connected in fluid communication with the source of pressurized gas to receive pressurized gas therefrom.

4. The vehicle of claim 3, wherein the source of pressurized gas is an internal combustion engine, and wherein the inlet of the piping structure is connected in fluid communication with the exhaust system component of the internal combustion engine.

5. The vehicle of claim 3, wherein the source of pressurized gas is selected from a group consisting of an electric pump, an electric fan, a mechanically driven fan, mechanically driven pump, a pneumatically driven pump, and a hydraulically driven pump.

6. The vehicle of claim 3, further comprising at least one valve positioned between the inlet and the forwardly-facing discharge port of the piping structure, the at least one valve capable of selectively supplying the stream of pressurized gas to the forwardly-facing discharge port.

7. The vehicle of claim 6, further comprising a controller operably connected to the at least one valve, the controller capable of controlling the operation of the at least one valve.

8. The vehicle of claim 7, further including at least one sensor connected in communication with the controller, the sensor capable of generating a signal indicative of the speed or acceleration of the vehicle, the controller configured to control the at least one valve in response to the signal generated by the sensor.

9. The vehicle of claim 8, wherein the at least one sensor is selected from a group consisting of a speed sensor, a throttle position sensor, and an accelerometer.

10. The vehicle of claim 1, wherein the front end includes:
an engine compartment; and
a grille mounted in front of the engine;
wherein the directed gas generation unit comprises an engine mounted in the engine compartment and coupled to the forwardly-facing discharge port, and wherein the forwardly-facing discharge port is configured to direct the stream of pressurized gas forwardly of the grille.

11. The vehicle of claim 1, wherein the front end includes:
an engine compartment; and
an engine mounted in the engine compartment;
wherein the directed gas generation unit comprises one of an electric pump, an electric fan, a mechanically driven fan, mechanically driven pump, a pneumatically driven pump, and a hydraulically driven pump.

12. A method of reducing drag on a vehicle, the vehicle having a front section, the method comprising:
generating a stream of pressurized gas;
selectively directing the stream of pressurized gas to one or more of a vehicle venting component and a forwardly-facing discharge port such that any portion of the stream of pressurized gas not directed to the forwardly-facing discharge port is directed to the vehicle venting component, wherein the forwardly-facing discharge port faces forwardly of the front section, outwardly of the vehicle, and substantially parallel to the longitudinal axis of the vehicle;

directing the stream of pressurized gas out of the forwardly-facing discharge port as the vehicle is moving forwardly in response to a speed or acceleration of the vehicle being greater than a threshold, wherein the threshold is one of a preselected vehicle speed and a preselected vehicle acceleration; and discontinuing the stream of pressurized gas out of the forwardly-facing discharge port in response to the speed or acceleration of the vehicle being less than the threshold.

13. The method of claim 12, wherein the stream of pressurized gas is generated by an internal combustion engine.

14. The vehicle of claim 8, further including a sensor configured to generate a signal indicative of vehicle braking, wherein the controller is configured to control the at least one valve in order to discontinue the stream of pressurized gas out of the forwardly-facing discharge port in response to the sensor generating the signal indicative of vehicle braking.

15. The vehicle of claim 1, further comprising:

a controller operably associated with the directed gas generation unit; and at least one sensor in communication with the controller, the at least one sensor capable of generating a signal indicative of the speed or acceleration of the vehicle, the controller configured to selectively direct the stream of pressurized gas to the one or more of the vehicle venting component or the forwardly-facing discharge port in response to the signal generated by the sensor.

16. A vehicle comprising:
a front section;
means for generating a stream of pressurized gas; and
means for selectively directing the stream of pressurized gas to one or more of an exhaust system component and a forwardly-facing discharge port as the vehicle is moving forwardly such that any portion of the stream of pressurized gas not directed to the forwardly-facing discharge port is directed to the exhaust system component, wherein the forwardly-facing discharge port faces forwardly of the front section, outwardly of the vehicle, and substantially parallel to the longitudinal axis of the vehicle, and wherein:

in response to attainment of one or more preselected vehicle operating conditions, the means for selectively directing the stream of pressurized gas is configured to direct the stream of pressurized gas to the forwardly-facing discharge port, wherein the preselected vehicle operation condition includes one of vehicle braking, a vehicle acceleration threshold value, and a vehicle speed threshold value, and in response to falling below the one or more preselected vehicle operating conditions, the means for selectively directing the stream of pressurized gas is configured to direct the stream of pressurized gas to the exhaust system component.

17. The vehicle of claim 16, where the one or more preselected vehicle operating conditions includes two or more preselected vehicle operating conditions.

* * * * *